(12) United States Patent
Baik

(10) Patent No.: US 6,671,575 B2
(45) Date of Patent: Dec. 30, 2003

(54) APPARATUS FOR STORING DISC-TYPE RECORDING MEDIA

(75) Inventor: Dae-Hyun Baik, Anyang (KR)

(73) Assignee: MID21 Corp., Seoul (KR)

( * ) Notice: Subject to any disclaimer, the term of this patent is extended or adjusted under 35 U.S.C. 154(b) by 97 days.

(21) Appl. No.: 09/957,441

(22) Filed: Sep. 19, 2001

(65) Prior Publication Data

US 2003/0055527 A1 Mar. 20, 2003

(51) Int. Cl.[7] .................................................. G06F 7/00
(52) U.S. Cl. .................... 700/218; 700/214; 360/98.01; 369/34; 369/36; 369/75.1
(58) Field of Search ............................. 369/36, 38, 34, 369/178, 192, 75.1; 360/97.01, 98.01, 98.04; 700/213, 214, 218

(56) References Cited

U.S. PATENT DOCUMENTS

| | | | | |
|---|---|---|---|---|
| 5,036,503 A | * | 7/1991 | Tomita | 369/30.43 |
| 5,040,159 A | * | 8/1991 | Oliver et al. | 369/30.34 |
| 5,247,408 A | * | 9/1993 | Osada et al. | 360/98.06 |
| 5,729,464 A | * | 3/1998 | Dimitri | 700/215 |
| 5,870,357 A | * | 2/1999 | Dondero | 369/30.55 |
| 5,870,360 A | * | 2/1999 | Ito et al. | 369/30.85 |
| 5,907,532 A | * | 5/1999 | Taylor | 369/75.1 |
| 5,940,355 A | * | 8/1999 | Buckland et al. | 369/30.55 |
| 6,005,744 A | * | 12/1999 | Terashima | 360/92 |
| 6,111,848 A | | 8/2000 | Hui | |
| 6,327,519 B1 | * | 12/2001 | Ostwald et al. | 700/245 |
| 6,356,803 B1 | * | 3/2002 | Goodman et al. | 700/218 |
| 6,370,444 B1 | * | 4/2002 | Kusunoki | 700/214 |
| 6,493,604 B1 | * | 12/2002 | Kappel et al. | 700/213 |

\* cited by examiner

Primary Examiner—Khoi H. Tran
(74) Attorney, Agent, or Firm—Ladas & Parry (57) ABSTRACT

An apparatus for storing a plurality of disc-type recording media is disclosed. The apparatus consists of a casing having disc select buttons, a tray rack having a plurality of retractable disc trays arranged along a vertical direction of the tray rack and loaded with discs thereon, and a lifting unit vertically moved to actuate a selected one of the disc trays. A timing belt is assembled with the lifting unit so as to move the lifting unit in the vertical direction. The apparatus also has a first motor operating the belt, and a horizontal moving unit assembled with the lifting unit and vertically moved along with the lifting unit. The horizontal moving unit is horizontally movable forward or backward relative to the lifting unit, and detachably holds a selected one of the disc trays. A rack is axially formed on the horizontal moving unit, while a rack wheel is provided at the lifting unit and engages with the rack of the horizontal moving unit. The rack wheel is operated by a second motor.

7 Claims, 8 Drawing Sheets

APPARATUS FOR STORING DISC-TYPE RECORDING MEDIA

BACKGROUND OF THE INVENTION

1. Field of the Invention

The present invention relates, in general, to an apparatus for storing disc-type recording media and, more particularly, to an apparatus designed to more easily and effectively store a plurality of disc-type recording media, and allow a user to more easily seat or take a recording media in or from the apparatus.

2. Description of the Prior Art

In accordance with the recent trend of rapid development and general use of computers, a variety of disc-type recording media, such as a CD-ROM, a CD-R and a CD-RW recorded with programs or data and designed to be used with computers, have been proposed and widely used. In addition, people in recent days more widely use DVDs, in addition to a conventional music CDs. Such disc-type recording media may replace paper documents, since the media is very convenient for keeping and handling. In accordance with a rapid increase in the amount and kinds of data to be recorded or stored in a media, the amount of disc-type recording media for home use or office use has quickly increased.

Figure 1:
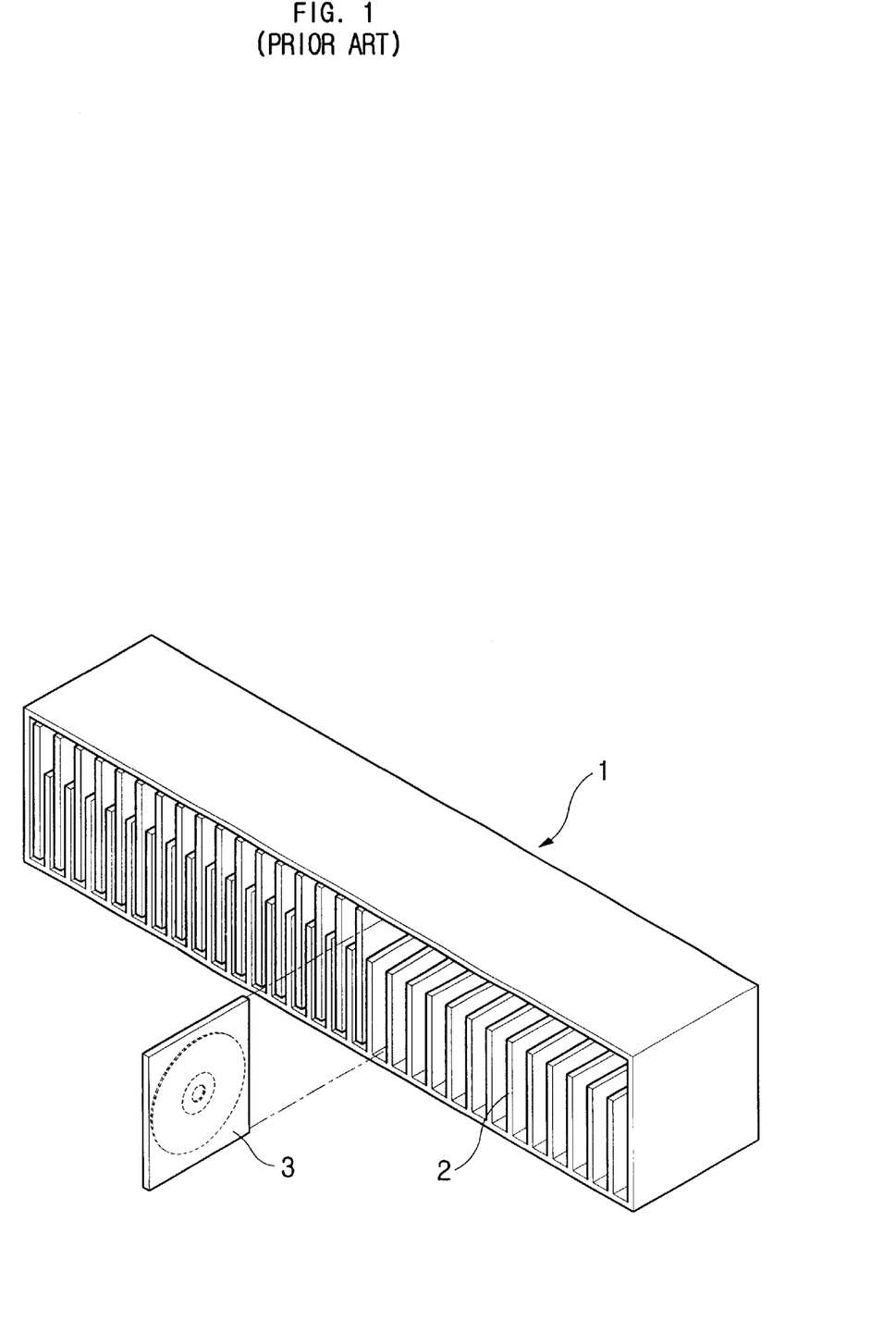
FIG. 1 is a perspective view of a conventional disc storage box.

In order to store a plurality of discs within a limited area or space, a disc storage box of FIG. 1 has been generally used. Such a conventional disc storage box 1 is partitioned in its interior into several storage cells by a plurality of partition walls 2, and stores a plurality of disc cases 3 inside the cells. However, the conventional disc storage box 1 is problematic in that it forces a user to take a required disc case 3 from a cell and then open the case 3 prior to removing a disc from the case 3 when the disc is required to be used. When it is needed to store a disc in the storage box 1 after using the disc, the user is forced to carefully seat the disc inside the case 3 prior to storing the case 3 in an empty cell of the box 1. In addition, the disc case 3 has a considerable thickness and volume, thus undesirably consuming an excessive space inside the storage box 1. Therefore, the number of cells provided in the conventional disc storage box 1 is undesirably limited. Furthermore, when a plurality of disc cases 3 are seated in the cells of the disc storage box 1 without a classification of the discs according to their contents, a user must consume excessive time while finding a desired disc along the cells of the box 1.

SUMMARY OF THE INVENTION

Accordingly, the present invention has been made keeping in mind the above problems occurring in the prior art, and an object of the present invention is to provide an apparatus for storing disc-type recording media, which easily and effectively stores a plurality of discs therein and automatically receives or ejects a disc in response to a simple manipulation of a button.

Another object of the present invention is to provide an apparatus for storing disc-type recording media, which has a simple and reliable operational mechanism suitable for easily and effectively storing and ejecting the recording media as desired.

A further object of the present invention is to provide an apparatus for storing disc-type recording media, which can be connected to an external computer and allow a user to easily identify stored discs through a monitor of the computer, thus letting the user more easily find a desired one of the stored discs when necessary.

In order to accomplish the above objects, the present invention provides an apparatus for storing a plurality of disc-type recording media, comprising: a casing; a tray rack installed inside the casing, with a plurality of disc trays loaded with discs thereon and arranged along a vertical direction inside the tray rack to be ejected or retracted relative to the casing; a lifting unit vertically moved inside the casing to actuate a selected one of the disc trays; a belt assembled with the lifting unit so as to move the lifting unit in the vertical direction; a first motor operating the belt; a horizontal moving unit assembled with the lifting unit and vertically moved along with the lifting unit, the horizontal moving unit being horizontally movable forward or backward relative to the lifting unit and detachably holding a selected one of the disc trays; and a drive means for horizontally moving the horizontal moving unit holding the selected disc tray forward or backward.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Reference now should be made to the drawings, in which the same reference numerals are used throughout the different drawings to designate the same or similar components.

Figure 2:
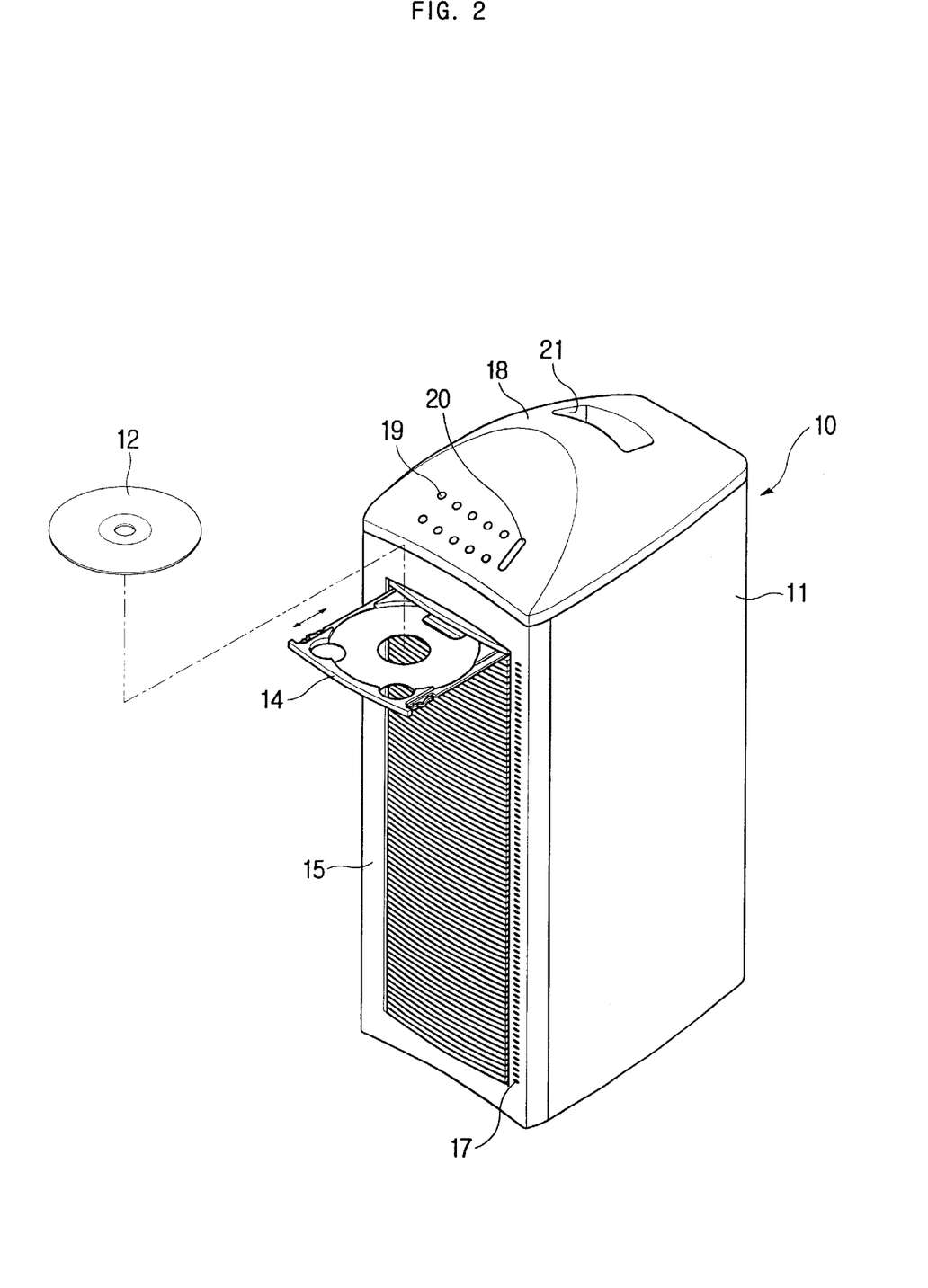
FIG. 2 is a perspective view of an apparatus in accordance with the preferred embodiment of the present invention, with the elements of the apparatus being fully assembled into a single body.

As shown in FIG. 2, the disc storing apparatus 10 according to the preferred embodiment of the present invention comprises a casing 11, with a plurality of movable disc trays 14, having a shape suitable for seating a naked disc 12 thereon and regularly arranged in the casing 11. The technical term "discs" expressed in the description of this invention means a variety of disc-type recording media, such as a CD-ROM, a CD-R, a CD-RW and a DVD recorded with programs or data and designed to be used with computers, in addition to including a conventional music CD. An opening 16 is formed on the front wall 15 of the casing 11 for allowing a forward ejection of the trays 14 from the casing 11. A plurality of light emitting diodes (LEDs) are regularly arranged on the front wall 15 of the casing 11 along a vertical edge of the opening 16 to form an LED display 17, in which the LEDs are positioned to be horizontally aligned with the trays 14 respectively. The LEDs of the display 17 are selectively turned on in a way such that only the LEDs corresponding to the trays 14 loaded with discs 12 emit light, thus allowing a user to easily distinguish disc-loaded trays from empty trays. A plurality of tray select buttons 19 marked with numerals are provided on the front part of the top wall 18 of the casing 11 for allowing a user to select a desired tray 14. The top wall 18 of the casing 11 is also provided with an actuation button 20 for ejecting or retracting a selected tray 14 relative to the casing 11. Formed on the top wall 18 of the casing 11 at a rear part is a grip depression 21 by which a user can grasp the casing 11 when it is desired to move the casing 11.

Figure 3:
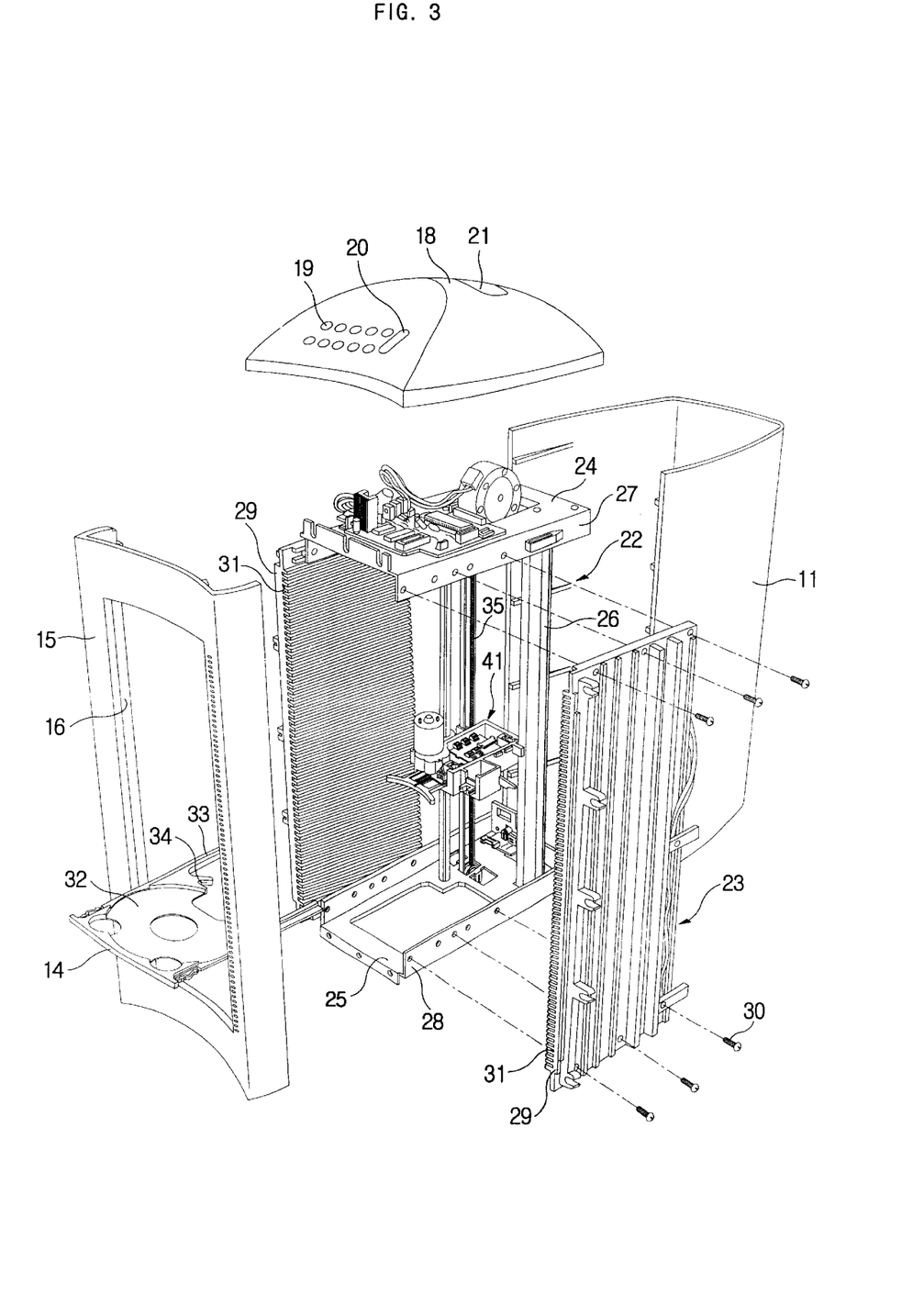
FIG. 3 is an exploded perspective view of the apparatus of this invention.

As shown in FIG. 3, a framework 22 and a tray rack 23 are installed inside the casing 11. The framework 22 comprises an upper frame 24 positioned under the top wall 18 of the casing 11, a lower frame 25 positioned at the bottom of the casing 11, and a support column 26 connecting the two frames 24 and 25 into a single structure while maintaining the shape of the framework 22. In order to assemble the tray rack 23 with the framework 22, each side edge of the upper frame 24 is bent downward to form a downward flange 27. In a similar manner, each side edge of the lower frame 25 is bent upward to form an upward flange 28.

The tray rack 23 comprises two side support panels 29 used for supporting the opposite side edges of each tray 14. The two side support panels 29 of the tray rack 23 are mounted at their upper and lower edges to the flanges 27 and 28 of the upper and lower frames 24 and 25 using a plurality of set screws 30. A plurality of tray guide channels 31 are regularly and horizontally formed on the inside surface of each side support panel 29, and guide a horizontal movement of the trays 14 when the trays 14 are ejected or retracted relative to the casing 11. The guide channels 31 horizontally extend between opposite side edges of each side support panel 29. Since the tray rack 23 has a plurality of tray guide channels 31 on its side support panels 29, it is possible to set a desired number of trays 14 in the tray rack 23.

Figure 4:
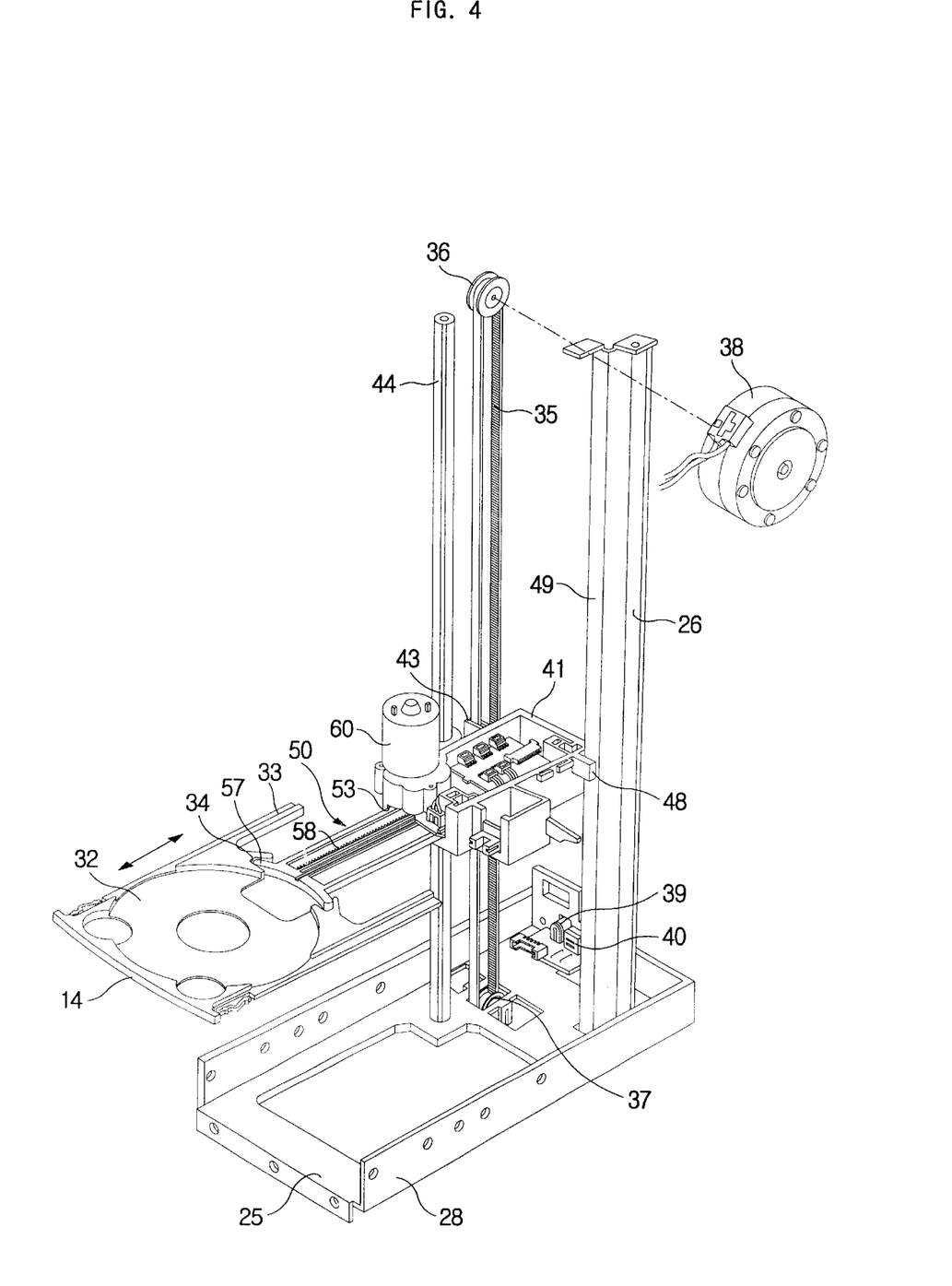
FIG. 4 is a perspective view, showing a relative arrangement of a lifting unit and a horizontal moving unit included in the apparatus of FIG. 3.

Each of the trays 14 consists of a circular disc seating part 32 for seating a naked disc 12 thereon, and a sliding part 33 extending rearward from each rear corner of the tray 14 and movably engaging with an associated guide channel 31 of the tray rack 23, as best seen in FIG. 4. Therefore, the disc trays 14 are horizontally movable under the guide of the channels 31 of the tray rack 23 so as to be ejected or retracted relative to the casing 11. Catching grooves 34 are formed on each disc tray 14 at opposite positions inside the two sliding parts 33, and detachably engage with projections 57 of a horizontal moving unit 50, as will be described in detail later herein.

As shown in FIGS. 3 and 4, a timing belt 35 is vertically arranged between the upper and lower frames 24 and 25 of the framework 22 at a position in back of the trays 14. That is, an upper pulley 36 for the timing belt 35 is provided at the upper frame 24, while a lower pulley 37 is provided at the lower frame 25. A first motor 38 is provided on the upper frame 24. In the present invention, the first motor 38 is a stepping motor connected to the upper pulley 36 to rotate the pulley 36 and the belt 35 in either direction. A variety of elements are installed on the upper frame 24, while a power supply terminal 39 and a communication port 40 for connecting the apparatus to an external computer are provided on the lower frame 25.

Figure 5:
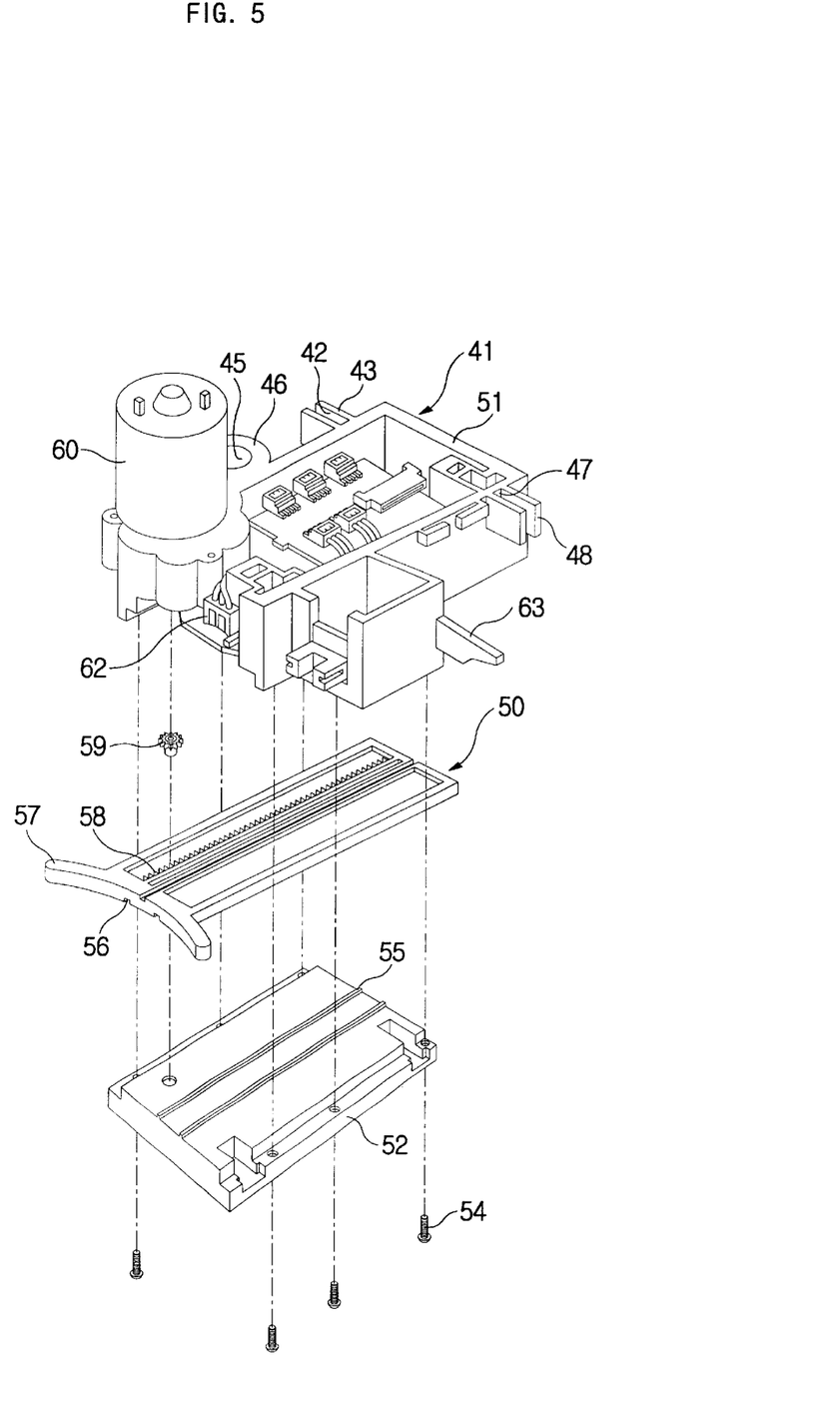
FIG. 5 is an exploded perspective view, showing the construction of the lifting unit and the horizontal moving unit of FIG. 4.
Figure 6:
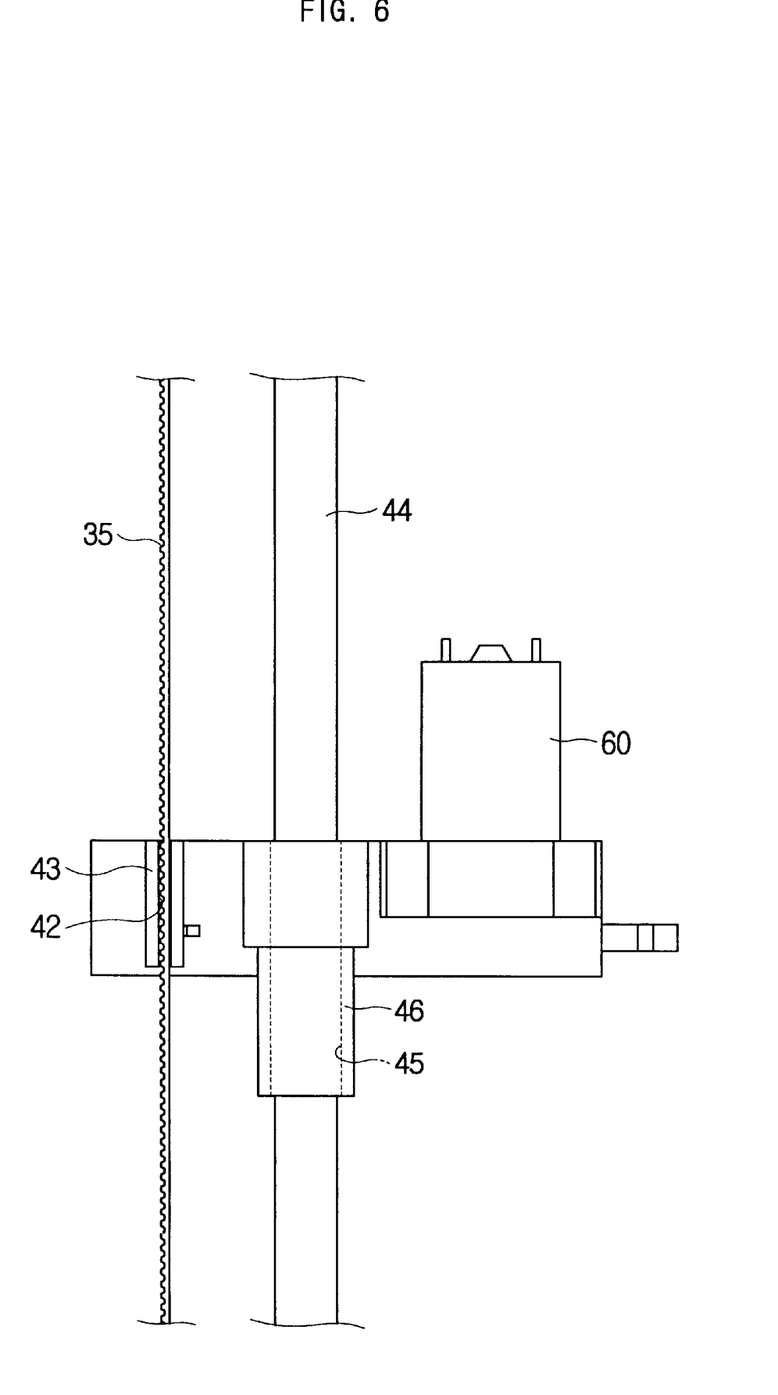
FIG. 6 is a side view, showing an engagement of a timing belt with the lifting unit of FIG. 4.

As shown in FIGS. 4 and 5, a lifting unit 41 is mounted to the timing belt 35 at a predetermined position such that the lifting unit 41 is movable in a vertical direction along with the timing belt 35. In order to attach the lifting unit 41 to the timing belt 35, two parallel fitting flanges 43 defining a fitting gap 42 between them horizontally extend from a sidewall of the lifting unit 41. One side of the timing belt 35 is forcibly fitted in the fitting gap 42 of the lifting unit 41, such that the lifting unit 41 is mounted to the timing belt 35 and is movable in a vertical direction in conjunction with a rotation of the timing belt 35 wrapped around the two pulleys 36 and 37. Of course, it should be understood that the mounting of the lifting unit 41 to the timing belt 35 may be accomplished by using a separate locking member in place of the forcible fitting process without affecting the functioning of this invention.

In order to stably guide a vertical movement of the lifting unit 41, a guide bar 44 vertically extends in the framework 22 in parallel to the support column 26. A guide part 46 having a slide hole 45 is formed on the lifting unit 41, and movably receives the guide bar 44. The top and bottom ends of the guide bar 44 are mounted to the upper and lower frames 24 and 25 respectively. Two parallel guide flanges 48 forming a guide channel 47 between them are formed on the sidewall of the lifting unit 41 at a position opposite to the two fitting flanges 43. A guide rail 49 is formed along the support column 26, and movably inserted into the guide channel 47 of the guide flanges 48. Since the guide rail 49 of the support column 26 movably engages with the guide flanges 48 of the lifting unit 41 as described above, the guide rail 49 supports the lifting unit 41 without allowing the unit 41 to undesirably move or rotate during a vertical movement of the unit 41, in addition to stably guiding the vertical movement of the unit 41.

A plate-type horizontal moving unit 50 is movably assembled with the lifting unit 41 such that the moving unit 50 is moved forward or backward relative to the lifting unit 41 so as to move a disc tray 14 in the same direction for locating or removing a disc on or from the disc tray. In order to accomplish a movable assembling of the horizontal moving unit 50 with the lifting unit 41, the lifting unit 41 includes upper and lower bodies 51 and 52, with a guide channel 53 defined between the two bodies 51 and 53 for receiving the horizontal moving unit 50 and guiding a horizontal movement of the unit 50 relative to the lifting unit 41. The upper and lower bodies 51 and 52 of the lifting unit 41 are locked together into a single body at their side edges using a plurality of set screws 54 while leaving the guide channel 53 between them. In order to guide a smooth horizontal movement of the horizontal moving unit 50 relative to the lifting unit 41, two parallel guide rails 55 are axially formed on the upper surface of the lower body 52, while two guide grooves 56 are axially formed on the lower surface of the horizontal moving unit 50 and movably engage with the two guide rails 55.

Two tray holding projections 57 are formed at the front end of the horizontal moving unit 50, and detachably engage with the two catching grooves 34 of a disc tray 14. When the two tray holding projections 57 are brought into engagement with the two catching grooves 34 of a disc tray 14, it is possible to move the disc tray 14 along with the horizontal moving unit 50 forward or backward in a horizontal direction. That is, the disc tray 14 can be ejected from or retracted into the front wall 15 of the casing 11 in accordance with a horizontal movement of the horizontal moving unit 50. A rack 58 is axially formed on the horizontal moving unit 50, while a rack wheel 59 is provided at the upper body 51 of the lifting unit 41 and engages with the rack 58. The rack wheel 59 is rotated by a second motor 60 installed on the upper body 51 of the lifting unit 41. In an operation of the apparatus 10 of this invention, the rack wheel 59 is rotated in either direction by the second motor 60, thus linearly moving the horizontal moving unit 50 forward or backward in a horizontal direction. A disc tray 14 engaging with the horizontal moving unit 50 is thus projected from or retracted into the front wall 15 of the casing 11.

Figure 7:
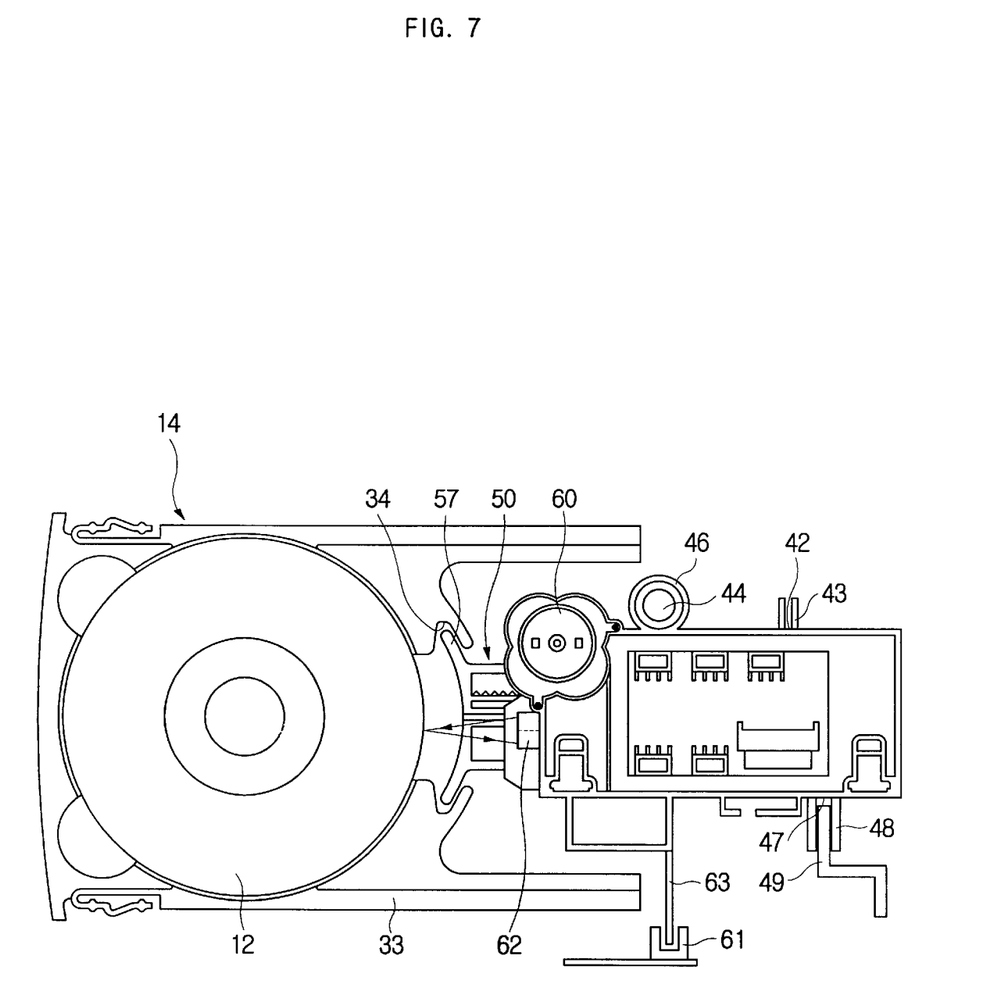
FIG. 7 is a plan view of the apparatus of this invention, showing the positions of sensors included in the apparatus.

As shown in FIG. 7, a position sensor 61 is installed at a middle portion of one side support panel 29 of the tray rack 23 for setting the reference positions of the lifting unit 41 and the horizontal moving unit 50. In addition, a disc sensor 62 is installed on the lifting unit 41 for sensing the presence of a disc on a selected disc tray 14 to determine whether the tray 14 is loaded with a disc or not. In the present invention, a conventional optical sensor is preferably used as the position sensor 61. A sensing projection 63 extends horizontally from the sidewall of the lifting unit 41 to a predetermined length, at which the projection 63 can be slightly overlapped with the position sensor 61 at its outside end. The disc sensor 62, installed at the front portion of the lifting unit 41, emits light in a forward direction and receives reflected light to determine the presence of a disc on a selected disc tray 14.

Figure 8:
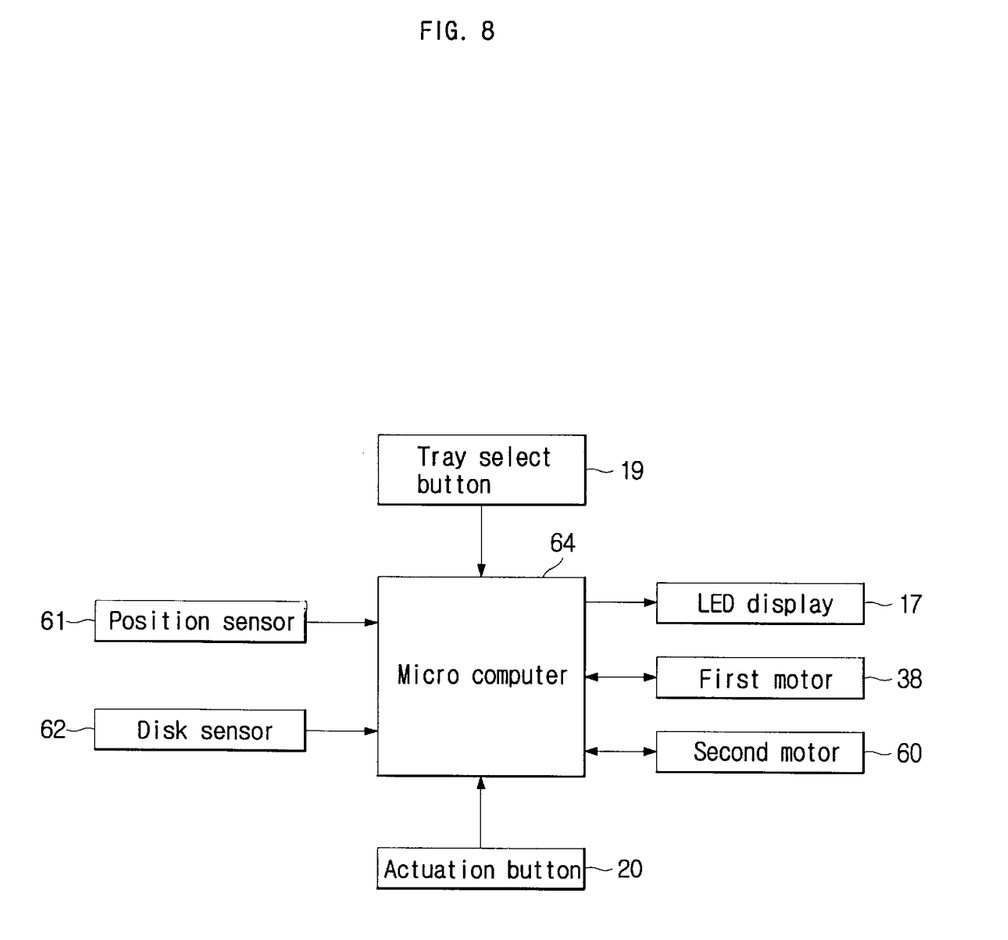
FIG. 8 is a block diagram of the apparatus of this invention.

As shown in FIG. 8, the position sensor 61, disc sensor 62, tray select buttons 19 and actuation button 20 are connected to the input ports of a microcomputer 64, while the first motor 38, second motor 60 and LED display 17 are connected to the output ports of the microcomputer 64. The first and second motors 38 and 60 are stepping motors, of which information of the revolutions per minute (rpm) and rotating direction is inputted to the microcomputer 64. Upon reception of a signal from a disc select button 19, the microcomputer 64 calculates a target position of the lifting unit 41, that is, a position to which the lifting unit 41 has to be vertically moved from its reference position defined by the position sensor 61. After calculating the target position of the lifting unit 41, the microcomputer 64 rotates the first motor 38 to vertically move the lifting unit 41 in either direction until the unit 41 reaches the target position. During a vertical movement of the lifting unit 41, the sensing projection 63 of the unit 41 is moved along with the lifting unit 41. When the sensing projection 63 passes through the position sensor 61, the sensor 61 outputs a signal to the microcomputer 64. After the sensing projection 63 completely passes through the position sensor 61, information of the rpm and rotating direction of the first motor 38 is inputted to the microcomputer 64, thus allowing the lifting unit 41 to reliably reach its target position. Therefore, it is possible for the lifting unit 41 to move in a vertical direction under the control of the microcomputer 64 from its reference position defined by the position sensor 61 to a desired target position at which the lifting unit 41 is horizontally aligned with a target disc tray 14 to be ejected from the casing 11 for allowing a user to locate or remove a disc 12 on or from the tray 14.

In an operation of the apparatus 10 of this invention, light is emitted from the disc sensor 62 in a forward direction. When the light is reflected by the edge surface of a disc 12 seated on the tray 14, and is received by the sensor 62 as shown in FIG. 7, the sensor 62 outputs a signal to the microcomputer 64. Upon reception of the signal from the disc sensor 62, the microcomputer 64 determines that there is a disc 12 on the disc tray 14. In such a case, an LED of the display 17 corresponding to the disc-loaded tray 14 is turned on under the control of the microcomputer 64. However, when the light from the disc sensor 62 is not reflected by any disc 12, the microcomputer 64 determines that the tray 14 is empty. In such a case, the associated LED of the display 17 is turned off.

The apparatus 10 of this invention is operated as follows:

When it is desired to eject a tray 14 for locating or removing a disc 12 on or from the tray 14, a user selects the desired tray 14 by operating an associated disc select button 19. After selecting a desired tray 14, the actuation button 20 is operated. When the actuation button 20 is operated by the user, the first and second motors 38 and 60 are rotated to move both the lifting unit 41 and the horizontal moving unit 50. In such a case, the first motor 38 is operated prior to the start of the second motor 60. That is, the microcomputer 64 calculates a height from the reference position defined by the position sensor 61 to the position of the target tray 14 prior to operating the first motor 38 to move the lifting unit 41 in a vertical direction, thus allowing the lifting unit 41 to reach the target tray 14 and locking the target tray 14 to the horizontal moving unit 50. After completely locking the tray 14 to the horizontal moving unit 50, the second motor 60 is rotated to move the horizontal moving unit 50 forward, thus ejecting the tray 14 forward from the front wall 15 of the casing 11.

The apparatus 10 in the above state allows a user to locate or remove a disc 12 on or from the tray 14. When the user operates the actuation button 20 again after locating or removing a disc 12 on or from the tray 14, the second motor 60 is rotated in a reverse direction to retract the tray 14 into the casing 11 by a backward movement of the horizontal moving unit 50. When the tray 14 is completely retracted into the casing 11, the disc sensor 61 senses a disc 12 on the tray 14 to allow the microcomputer 64 to determine the presence of a disc on the tray 14 and turn on or off the associated LED of the display 17 in the same manner as that described above. In such a case, the LED of the display 17 is turned on under the control of the microcomputer 64 when a disc 12 is loaded on the tray 14.

The disc storing apparatus of this invention may be used in connection with an external computer installed with a dedicated program even though such a use of the apparatus with a computer is not shown in the accompanying drawings. When the apparatus of this invention is used with such an external computer, it is possible to check the presence of a disc on a selected tray through a monitor. In such a case, information of contents of the discs loaded on the disc trays of the apparatus is stored in the computer, thus allowing a user to search the contents of the stored discs through the monitor and easily select desired discs. Another advantage expected from the use of the apparatus in connection with such an external computer resides in that it is possible to control the operation of both the lifting unit and the horizontal moving unit of the apparatus by manipulating a conventional input device of the computer without using a disc select button or an actuation button.

As described above, the present invention provides an apparatus for effectively storing a plurality of discs while allowing a user to locate or remove a disc in or from the apparatus. This apparatus also uses a timing belt for moving a lifting unit to a desired position in a vertical direction within the casing of the apparatus, and uses a rack and rack wheel for moving a horizontal moving unit forward or backward, thus having an effective and highly reliable disc moving mechanism with a simple construction. In addition, when the apparatus of this invention is used in connection with an external computer installed with a dedicated program, it is possible for a user to easily search the contents of stored discs through a monitor and easily select desired discs. This apparatus also stores naked discs without their being housed within disc cases, thus more efficiently storing the discs within a limited space.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for storing a plurality of disc-type recording media, comprising:
   a casing;
   a tray rack installed inside said casing, with a plurality of disc trays capable of being loaded with discs thereon and arranged along a vertical direction inside the tray rack to be ejected or retracted relative to the casing;
   a lifting unit, vertically movably mounted inside the casing to actuate a selected one of the disc trays;
   a belt assembled with said lifting unit so as to move the lifting unit in the vertical direction;
   a first motor operating the belt;
   a moving unit assembled with the lifting unit and vertically moved along with the lifting unit to be connected with a selected one of the disc trays, said moving unit being movable forward or backward relative to the lifting unit for locating or removing a disc on or from the selected disc tray; and
   drive means for moving the moving unit holding the selected disc tray forward or backward;
   wherein said moving unit has a rack axially formed on the moving unit, said drive means includes a rack wheel provided at the lifting unit and engaging with said rack of the moving unit and a second motor operating the rack wheel.

2. The apparatus according to claim 1, wherein said lifting unit comprises upper and lower bodies, with a guide channel defined between the upper and lower bodies for guiding a movement of the moving unit.

3. The apparatus according to claim 1, wherein each of said disc trays is provided with a catching groove at its rear end, and said moving unit is provided with a tray holding projection at its front end, said tray holding projection having a shape suitable for engaging with the catching groove of each disc tray.

4. The apparatus according to claim 1, further comprising:
   a guide bar used for guiding the vertical movement of the lifting unit; and
   a guide part provided on said lifting unit, said guide part having a slide hole for receiving said guide bar.

5. The apparatus according to claim 1, wherein said lifting unit has a disc sensor for sensing a presence of a disc on a disc tray to determine whether the tray is loaded with a disc or not.

6. The apparatus according to claim 1, wherein said casing has a tray select button for selecting a desired one of the disc trays.

7. An apparatus for storing a plurality of disc-type recording media, comprising:
   a casing;
   a tray rack installed inside said casing, with a plurality of disc trays capable of being loaded with discs thereon and arranged along a vertical direction inside the tray rack to be ejected or retracted relative to the casing;
   a lifting unit, located behind the tray rack, vertically movably mounted inside the casing to actuate a selected one of the disc trays;
   a belt assembled with said lifting unit so as to move the lifting unit in the vertical direction;
   a first motor operating the belt;
   a moving unit assembled with the lifting unit and vertically moved along with the lifting unit to be connected with a selected one of the disc trays, said moving unit being movable forward or backward relative to the lifting unit for locating or removing a disc on or from the selected disc tray; and
   drive means for moving the moving unit holding the selected disc tray forward or backward;
   wherein said lifting unit has a guide channel for guiding a movement of the moving unit, said moving unit has a rack axially formed on the moving unit, said drive means includes a rack wheel provided at the lifting unit and engaging with said rack of the moving unit and a second motor operating the rack wheel, and said disc trays move out of the case for removing a disc from the selected disc tray.

* * * * *